(12) United States Patent
Bruett et al.

(10) Patent No.: US 10,829,100 B2
(45) Date of Patent: Nov. 10, 2020

(54) HYDRAULIC BRAKE SYSTEM

(71) Applicant: WABCO GmbH, Hannover (DE)

(72) Inventors: Mirko Bruett, Ronnenberg (DE);
Michael Haverkamp, Hannover (DE)

(73) Assignee: WABCO GMBH, Hannover (DE)

( * ) Notice: Subject to any disclaimer, the term of this patent is extended or adjusted under 35 U.S.C. 154(b) by 187 days.

(21) Appl. No.: 15/764,333

(22) PCT Filed: Nov. 14, 2016

(86) PCT No.: PCT/EP2016/001893
§ 371 (c)(1),
(2) Date: Mar. 29, 2018

(87) PCT Pub. No.: WO2017/088959
PCT Pub. Date: Jun. 1, 2017

(65) Prior Publication Data
US 2018/0265061 A1 Sep. 20, 2018

(30) Foreign Application Priority Data
Nov. 28, 2015 (DE) ......................... 10 2015 015 472

(51) Int. Cl.
*B60T 8/34* (2006.01)
*B60T 13/14* (2006.01)
(Continued)

(52) U.S. Cl.
CPC .............. *B60T 8/344* (2013.01); *B60T 8/341* (2013.01); *B60T 8/3605* (2013.01); *B60T 8/365* (2013.01);
(Continued)

(58) Field of Classification Search
CPC .......... B60T 8/344; B60T 8/3605; B60T 8/48; B60T 8/365; B60T 8/341; B60T 13/141; B60T 13/686; B60T 7/04
See application file for complete search history.

(56) References Cited

U.S. PATENT DOCUMENTS 3,866,982 A * 2/1975 Geier .................... B60T 8/3605
303/118.1
4,743,076 A * 5/1988 Davis ...................... B60T 8/343
137/627.5
(Continued)

FOREIGN PATENT DOCUMENTS

DE 3240277 * 5/1984
DE 19546056 A1 6/1997
(Continued)

*Primary Examiner* — Vishal R Sahni
(74) *Attorney, Agent, or Firm* — Leydig, Voit & Mayer, Ltd.

(57) ABSTRACT

A power-operated hydraulic brake system for a wheeled vehicle includes a main brake line; a brake valve configured to input a target brake pressure into the main brake line, the brake vale configured to be actuated via a brake pedal; a plurality of wheel brake lines branching off from the brake valve, each of which leads to an actuating unit of a wheel brake; and a valve assembly of an ABS control system. The valve assembly includes an inlet valve arranged between the main brake line and one of the wheel brake lines, and an outlet valve arranged between the relevant wheel brake line and an unpressurized return line. The inlet valve and the outlet valve are pressure-controlled 2/2-way switching valves with correspondingly large switching cross sections, and the inlet valve and the outlet valve are each assigned at least one pilot valve designed as a solenoid switching valve.

16 Claims, 6 Drawing Sheets

(51) Int. Cl.
  *B60T 13/68* (2006.01)
  *B60T 8/36* (2006.01)
  *B60T 8/48* (2006.01)
  *B60T 8/44* (2006.01)
  *B60T 7/04* (2006.01)

(52) U.S. Cl.
  CPC .............. *B60T 8/48* (2013.01); *B60T 13/141* (2013.01); *B60T 13/686* (2013.01); *B60T 7/04* (2013.01); *B60T 8/44* (2013.01)

(56) References Cited

U.S. PATENT DOCUMENTS

| | | |
|---|---|---|
| 5,375,506 A | 12/1994 | Hashida et al. |
| 5,600,954 A | 2/1997 | Bay et al. |
| 6,478,384 B2 | 11/2002 | Luelfing |
| 2004/0150261 A1* | 8/2004 | Kawaguchi ............... B60L 7/24 303/118.1 |
| 2005/0200199 A1* | 9/2005 | Kamiya ................. B60T 7/065 303/191 |
| 2006/0125316 A1 | 6/2006 | Kawaguchi et al. |
| 2007/0236084 A1* | 10/2007 | Frank ...................... B60T 8/327 303/119.2 |
| 2010/0187900 A1 | 7/2010 | Remmelmann et al. |
| 2012/0175943 A1* | 7/2012 | Grebe ................... B60T 8/3605 303/113.2 |
| 2015/0291140 A1* | 10/2015 | Ishida ................... B60T 13/165 303/10 |
| 2016/0304070 A1* | 10/2016 | Wieder ................... B60T 8/175 |
| 2017/0036654 A1* | 2/2017 | Fullgrabe .............. B60T 8/3605 |
| 2017/0253224 A1* | 9/2017 | Dreyer ................... B60T 8/3605 |
| 2018/0244250 A1* | 8/2018 | Heinrich ............... B60T 8/3605 |
| 2018/0370513 A1* | 12/2018 | Bialon .................. B60T 8/3605 |

FOREIGN PATENT DOCUMENTS

| | | |
|---|---|---|
| DE | 19744389 | * 4/1999 |
| DE | 102006024183 A1 | 11/2007 |
| DE | 102008049551 A1 | 4/2009 |
| EP | 1013528 B1 | 4/2007 |
| JP | H 0680064 A | 3/1994 |

\* cited by examiner

HYDRAULIC BRAKE SYSTEM

CROSS REFERENCE TO RELATED APPLICATIONS

This application is a U.S. National Phase application under 35 U.S.C. § 371 of International Application No. PCT/EP2016/001893 (WO 2017/088959 A1), filed on Nov. 14, 2016, and claims benefit to German Patent Application No. DE 10 2015 015 472.9, filed Nov. 28, 2015.

FIELD

The invention relates to a power-operated hydraulic brake system for a wheeled vehicle, having a main brake line, into which a target brake pressure can be input by means of a brake valve that can be actuated via a brake pedal, and from which a plurality of wheel brake lines, each of which leads to an actuating unit of a wheel brake, branches off.

BACKGROUND

Whereas passenger cars and light commercial vehicles generally have a pedal-force-based hydraulic brake system and heavier commercial vehicles have a power-operated pneumatic brake system, wheeled vehicles which are provided for off-highway use, such as construction machines and agricultural tractors, can be fitted with a power-operated hydraulic brake system. Owing to the high braking forces required, the actuating units of the wheel brakes, such as wheel brake cylinders and brake calipers, in such wheeled vehicles have a relatively large displacement volume, which can only be delivered with a power-operated brake system. Since construction machines and agricultural tractors generally have hydraulic attachments or even have a hydrostatic drive, a power-operated hydraulic brake system can advantageously use the already existing hydraulic pressure supply device.

In the present case, the starting point is a power-operated hydraulic brake system of a wheeled vehicle which comprises a main brake line and a plurality of wheel brake lines, which branch off from the main brake line and each of which leads to an actuating unit of a wheel brake, and a valve assembly of an ABS control system (antilock system control). A target brake pressure can be input into the main brake line by means of a brake valve that can be actuated by a driver via a brake pedal. In one embodiment of the wheel brakes as drum brakes, the actuating units of the wheel brakes are generally designed as wheel brake cylinders, by means of the pistons of which the relevant brake shoes are pressed against the brake drums connected for conjoint rotation to the wheel hubs in order to brake the vehicle wheels. When the wheel brakes are embodied as disk brakes, the actuating units of the wheel brakes are generally brake calipers, in which the relevant brake linings are pressed by means of pistons against brake disks connected for conjoint rotation to the wheel hubs in order to brake the vehicle wheels.

In each case, the valve assembly of the ABS control system comprises an inlet valve arranged between the main brake line and one of the wheel brake lines and comprises an outlet valve arranged between the relevant wheel brake line and an unpressurized return line. In the unactuated state, the inlet valves are open and the outlet valves are closed, with the result that the target brake pressure specified by the driver is also effective in the wheel brake lines and the wheel brake actuating units connected thereto. Consequently, the wheeled vehicle concerned is then braked in accordance with the actuation of the brake pedal by the driver. However, if a vehicle wheel which is locked or is just about to lock up is detected during a braking operation by evaluation of rotational speed sensors arranged on the vehicle wheels, the inlet valve of the relevant actuating unit is closed and the associated outlet valve is opened, with the result that the wheel brake of the relevant vehicle wheel is released. When the relevant vehicle wheel is once again rotating with a sufficiently high rotational speed, the inlet valve of this actuating unit is opened again and the associated outlet valve is closed until a large rotational speed reduction is detected once again at the relevant vehicle wheel. By alternately opening and closing the inlet valves and the outlet valves, locking of the vehicle wheels is thus prevented and the brakeability and steerability of the wheeled vehicle concerned is maintained.

To enable the brake pressure to be reduced via the main brake line and the brake valve if a higher brake pressure is enclosed in one of the wheel brake lines than in the main brake line when the brake pedal is released in the case of the inlet and outlet valves simultaneously being closed due to a fault, safety valves are usually provided. These safety valves can be implemented in the form of check valves, each arranged in parallel with the inlet valves, between the wheel brake lines and the main brake line, and opening in the direction of the main brake line or in the form of check valves integrated into the inlet valves and opening in the direction of the main brake line.

In DE 195 46 056 A1 and EP 1 013 528 B1, a description is given of power-operated hydraulic brake systems of a motor vehicle which each comprise two brake circuits, a valve assembly of an ABS control system and a valve assembly of a traction control system. There, the inlet valves and the outlet valves of the valve assembly of the ABS control system are each designed as 2/2-way solenoid switching valves. While the safety valves in the valve assembly of the ABS control system according to DE 195 46 056 A1 are designed as check valves, each arranged in parallel with the inlet valves, the valve assembly of the ABS control system according to EP 1 013 528 B1 has check valves or check valve functions integrated into the inlet valves for this purpose.

Particularly for large and heavy agricultural tractors with wheel brakes of correspondingly large dimensions, valve assemblies of the ABS control system that have high volume flow rates and as high as possible an ABS control frequency are appropriate if they are fitted with a power-operated hydraulic brake system. It is virtually impossible to implement this requirement with inlet and outlet valves designed as solenoid switching valves since either the switching cross sections of the solenoid switching valves are too small for this purpose or the switching speed of the solenoid switching valves is too low and the power consumption thereof is too high.

MICO Inc., USA supplies ABS control valves for the ABS control of heavy wheeled vehicles for off-highway use which are designed as 3/3-way proportional solenoid valves and each include the functions of an inlet valve and an outlet valve. Information on these ABS control valves can be found in the brochure "Electrohydraulic Components" (Form No. 84-850-028), which can be downloaded as a PDF document from the homepage of MICO Inc. (www.mico.com). Although ABS control valves of this kind are designed for a high volume flow rate, they allow only a relatively low ABS control frequency.

SUMMARY

In an embodiment, the present invention provides a power-operated hydraulic brake system for a wheeled vehicle. The power-operated hydraulic brake system includes a main brake line; a brake valve configured to input a target brake pressure into the main brake line, the brake vale configured to be actuated via a brake pedal; a plurality of wheel brake lines branching off from the brake valve, each of which leads to an actuating unit of a wheel brake; and a valve assembly of an ABS control system. The valve assembly includes an inlet valve arranged between the main brake line and one of the wheel brake lines, and an outlet valve arranged between the relevant wheel brake line and an unpressurized return line. The inlet valve and the outlet valve are pressure-controlled 2/2-way switching valves with correspondingly large switching cross sections, and the inlet valve and the outlet valve are each assigned at least one pilot valve designed as a solenoid switching valve, via which a control port of a relevant inlet or outlet valve is alternately supplied with a control pressure or vented for the purpose of switching over.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide power-operated hydraulic brake systems for wheeled vehicles, having a main brake line, into which a target brake pressure can be input by means of a brake valve that can be actuated via a brake pedal, and from which a plurality of wheel brake lines, each of which leads to an actuating unit of a wheel brake, branches off, and having a valve assembly of an ABS control system, which in each case comprises an inlet valve arranged between the main brake line and one of the wheel brake lines and comprises an outlet valve arranged between the relevant wheel brake line and an unpressurized return line.

Owing to future demands on brake systems of heavy wheeled vehicles for off-highway use, embodiments of the invention provide a valve assembly of an ABS control system for a power-operated hydraulic brake system of a wheeled vehicle which combines a high volume flow rate with a high ABS control frequency and a low energy consumption for the control of the ABS valves (inlet and outlet valves).

According to embodiments of the invention, an inlet valve and an outlet valve are designed as pressure-controlled 2/2-way switching valves with correspondingly large switching cross sections, and in that the inlet valve and the outlet valve are each assigned at least one pilot valve designed as a solenoid switching valve, via which a control port of the relevant inlet or outlet valve are alternately supplied with a control pressure or vented for the purpose of switching over.

A power-operated hydraulic brake system of a wheeled vehicle includes a main brake line and a valve assembly of an ABS control system. A target brake pressure can be input into the main brake line by means of a brake valve that can be actuated via a brake pedal. A plurality of wheel brake lines, each of which leads to an actuating unit of a wheel brake, such as a wheel brake cylinder or brake caliper, branches off from the main brake line. The valve assembly of the ABS control system in each case comprises an inlet valve arranged between the main brake line and one of the wheel brake lines and comprises an outlet valve arranged between the relevant wheel brake line and an unpressurized return line.

In order to achieve the high volume flow rate required for the wheel brakes of heavy wheeled vehicles provided for off-highway use, combined with a high ABS control frequency and a low energy consumption for the control of the ABS valves, embodiments of the present invention provide an inlet valve and an outlet valve designed as pressure-controlled 2/2-way switching valves with correspondingly large switching cross sections, which can each be controlled by means of at least one pilot valve designed as a solenoid switching valve, with the result that a control port of the relevant inlet or outlet valve is alternately supplied with a control pressure or vented via the associated pilot valve or associated pilot valves for the purpose of switching over.

The solenoid valves used as pilot valves have a high switching speed and a low power consumption of the solenoids thereof, and therefore the valve assembly of the ABS control system overall combines a high volume flow rate with a high ABS control frequency and a low energy consumption for the control of the ABS valves thereof.

According to a first basic embodiment of the pilot valves, it is envisaged that the inlet valve and/or the outlet valve is/are each assigned a pilot valve designed as a 3/2-way solenoid switching valve, which is arranged between a high-pressure line connected to a pressure source, a control pressure line leading to the relevant control port, and a low-pressure line connected to a pressure sink, wherein the control pressure line is connected to the low-pressure line and shut off from the high-pressure line in the deenergized state of the relevant pilot valve, and wherein the control pressure line is connected to the high-pressure line and shut off from the low-pressure line in the energized state of the relevant pilot valve.

According to a second basic embodiment of the pilot valves, it is envisaged that the inlet valve and/or the outlet valve is/are each assigned two pilot valves designed as 2/2-way solenoid switching valves, of which the first pilot valve is arranged between a high-pressure line connected to a pressure source and a control pressure line leading to the relevant control port, which lines are shut off from one another in the deenergized state of the first pilot valve and are connected to one another in the energized state of the first pilot valve, and of which the second pilot valve is arranged between the control pressure line and a low-pressure line connected to a pressure sink, which lines are connected to one another in the deenergized state of the second pilot valve and shut off from one another in the energized state of the second pilot valve.

In both basic embodiments of the pilot valves, the pressure prevailing in the pressure source is thus used as the high control pressure and the pressure prevailing in the pressure sink is used as the low control pressure. The normal practice in a valve assembly of an ABS control system is to use solenoid valves of the same type to control the inlet and outlet valves so as to simplify control and save production costs through the use of pilot valves of identical construction. However, it is also possible in principle to use different designs of pilot valve in a valve assembly of an ABS control system, e.g. to control the inlet valves by means of two 2/2-way solenoid switching valves in each case and to control the outlet valves by means of a single 3/2-way solenoid switching valve in each case.

In respect of the pressure medium used to control the ABS valves (inlet valve and outlet valve), provision can be made for the inlet valve and the outlet valve to be of hydraulically controllable design, for the hydraulic high-pressure lines leading to the associated pilot valves to branch off from a hydraulic control pressure main line, which is connected to a hydraulic main pressure line of a hydraulic pressure supply system, and for the hydraulic low-pressure lines connected to the associated pilot valves to lead into an unpressurized collecting tank.

It would also be possible for the high-pressure lines to be connected directly to a connecting line branching off from the main brake line, but the target brake pressure prevailing in the main brake line is variable and dependent on the actuation of the brake pedal, as a result of which ABS control may be impaired, especially with weak actuation of the wheel brakes and a particularly slippery roadway, such as that in the case of black ice or a loose underlying surface. In the main pressure line, in contrast, the pressure is largely constant, and therefore the response of the ABS valves is always the same, irrespective of the target brake pressure input into the main pressure line. As mentioned, the low-pressure lines of the associated pilot valves each lead in this case into an unpressurized collecting tank, which can be connected by a return line to a collecting tank of the hydraulic pressure supply system.

Since the flow velocity of the hydraulic oil in the control pressure lines and the pilot valves and hence the response of the ABS valves is determined to a significant extent by the temperature-dependent viscosity of the hydraulic oil, a temperature sensor for detecting the oil temperature of the available hydraulic oil is arranged in the hydraulic pressure supply system according to one embodiment. The control algorithm for controlling the pilot valves can thus be adapted to the respectively prevailing oil temperature of the hydraulic oil.

A heating element for heating the available hydraulic oil is likewise preferably provided in the hydraulic pressure supply system. In wheeled vehicles, such as construction machines and agricultural tractors, which are provided for off-highway use, hydraulic oil of particularly high viscosity is often used particularly for driving attachments. In the cold state, the high viscosity of the hydraulic oil then prevailing inevitably leads to a delayed response by the ABS valves, it being possible to avoid this by heating the hydraulic oil by means of the heating element. Monitoring the oil temperature of the hydraulic oil by means of the temperature sensor enables the heating element to be switched off at the correct time and hence enables overheating of the hydraulic oil to be avoided.

The temperature sensor and/or the heating element is/are preferably arranged on or in a storage reservoir of the hydraulic pressure supply system since, with this arrangement, precise detection of the oil temperature and effective heating of the hydraulic oil can be achieved.

As an alternative to hydraulic control, it is also possible for the inlet valve and the outlet valve to be of pneumatically controllable design. Although this presupposes a pneumatic pressure supply system, it has the advantage that solenoid switching valves of identical construction can be used as pilot valves, and these are also normally used in air braking systems. In this case, the high-pressure lines of the associated pilot valves preferably branch off from a control pressure main line, which is connected to a pneumatic main pressure line of a pneumatic pressure supply system, in which the pressure is largely constant. The pneumatic low-pressure lines of the associated pilot valves each lead to a vent outlet, which can be a common vent outlet or a separate vent outlet.

Figure 1:
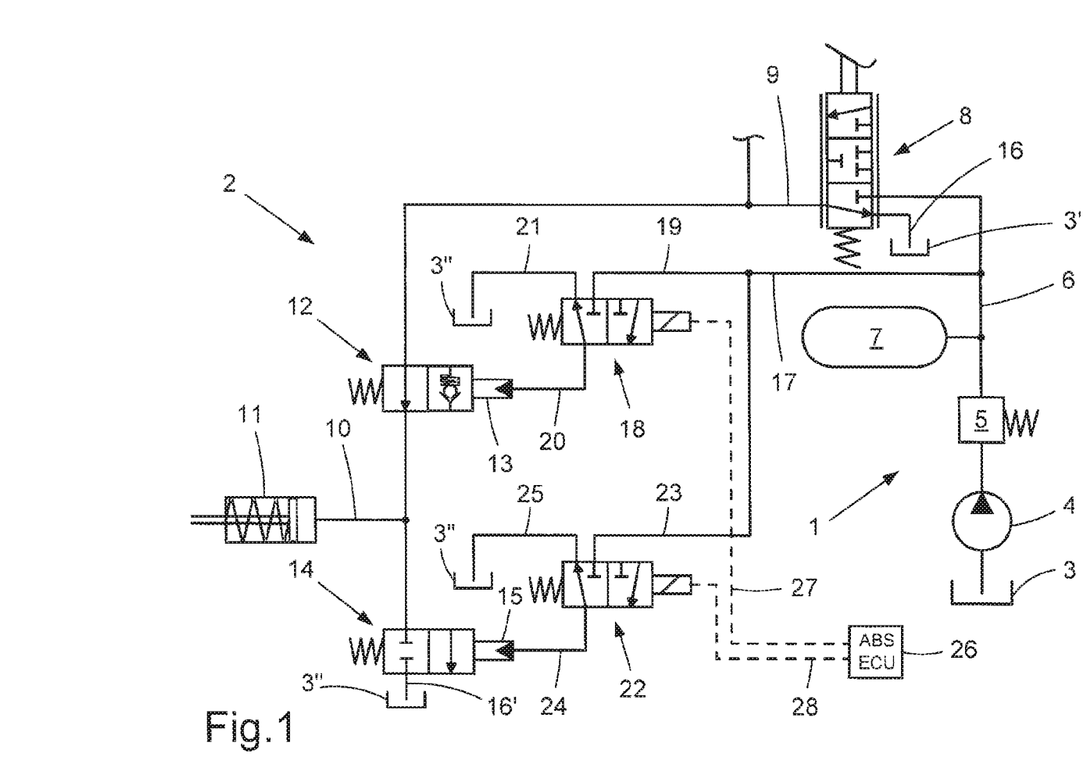
FIG. 1 shows a power-operated hydraulic brake system of a wheeled vehicle having a first valve arrangement according to an embodiment of the invention in an ABS control system in a schematic view.

FIG. 1 depicts a detail of a power-operated hydraulic brake system of a wheeled vehicle in schematic form, which comprises a hydraulic pressure supply system 1 and a valve assembly 2, assigned to an individual wheel brake, of an antilock brake control system (ABS control system).

In the hydraulic pressure supply system 1, hydraulic oil can be pumped into a hydraulic main pressure line 6 from a collecting tank 3 via a pressure limiting valve 5 by means of an oil pump 4. A storage reservoir 7 and a brake valve 8 are connected to this hydraulic main pressure line 6. The storage reservoir 7 is at least partially filled with hydraulic oil under the main pressure of the hydraulic main pressure line 6. A target brake pressure can be input into a connected main brake line 9 by means of the brake valve 8, which is designed as a 3/3-way proportional valve and is actuated by means of a brake pedal. In the unactuated state of rest of the brake valve 8, the main brake line 9 is connected to an unpressurized return line 16, which leads into a collecting tank 3', whereby the main brake line 9 is vented. In the state of the brake valve 8 in which it is actuated to the maximum extent by means of the brake pedal, the main brake line 9 is connected in an unrestricted manner to the hydraulic main pressure line 6, as a result of which the target brake pressure prevailing in the main brake line 9 corresponds to the main pressure prevailing in the hydraulic main pressure line 6. The target brake pressure prevailing in the main brake line 9 can thus be adjusted between the ambient pressure and the main pressure by means of the brake valve 8.

A wheel brake line 10 leading to an actuating unit 11 of a wheel brake (not shown specifically) branches off from the main brake line 9. In the present case, the wheel brake is embodied, by way of example, as a drum brake, the actuating unit 11 of which is formed by a wheel brake cylinder. The valve assembly 2 of the ABS control system comprises an inlet valve 12, which is arranged between the main brake line 9 and the wheel brake line 10, and an outlet valve 14, which is arranged between the wheel brake line 10 and an unpressurized return line 16' leading into a collecting tank 3".

According to the invention, the inlet valve 12 and the outlet valve 14 are designed as hydraulically pressure-controlled 2-2-way switching valves with correspondingly large switching cross sections, to each of which in the present case a pilot valve 18, 22 designed as a 3/2-way solenoid switching valve is assigned. Via the pilot valves 18, 22, a respective control port 13, 15 of the relevant inlet or outlet valve 12, 14 can be alternately supplied with a low or a high control pressure for the purpose of switching over.

In the unactuated state of the inlet valve 12, i.e. the state in which it is supplied with the low control pressure, the wheel brake line 10 is connected to the main brake line 9, as a result of which the wheel brake is actuated with the target brake pressure. In the actuated state of the inlet valve 12, i.e. the state in which it is supplied with the high control pressure, the wheel brake line 10 is sealed off from the main brake line 9. However, ventilation of the wheel brake line 10 via the main brake line 9 and the brake valve 8 is then possible via a check valve integrated into the inlet valve 12, this ventilation coming into effect if the brake pedal has been released in the meantime and the target brake pressure has decreased as a result.

In the unactuated state of the outlet valve 14, the wheel brake line 10 is shut off from the return line 16'. In the actuated state of the outlet valve 14, the wheel brake line 10 is connected to the return line 16', as a result of which the wheel brake cylinder 11 is ventilated and the wheel brake is released.

By virtue of the design and arrangement of the valve assembly 2, the inlet and outlet valves 12, 14 have a high volume flow rate and a high control frequency of the ABS control system. Moreover, the energy consumption for the control of the inlet and outlet valves 12, 14 by means of the pilot valves 18, 22 is relatively low.

The pilot valve 18 of the inlet valve 12 is arranged between a hydraulic high-pressure line 19, which branches off from a hydraulic control pressure main line 17 connected to the hydraulic main pressure line 6, a control pressure line 20 leading to the control port 13 of the inlet valve 12, and a hydraulic low-pressure line 21 leading into a collecting tank 3". In the state of rest, i.e. in the deenergized state of the solenoid of the pilot valve 18, the control pressure line 20 is shut off from the hydraulic high-pressure line 19 and connected to the hydraulic low-pressure line 21. In the actuated state, i.e. in the energized state of the solenoid of the pilot valve 18, the control pressure line 20 is connected to the hydraulic high-pressure line 19 and shut off from the hydraulic low-pressure line 21. Thus, the control port 13 of the inlet valve 12 is supplied with the low control pressure or ambient pressure in the actuated state of the associated pilot valve 18, as a result of which the inlet valve 12 remains in its rest position depicted in FIG. 1 or is switched to this position. In the unactuated state of the pilot valve 18, in contrast, the control port 13 of the inlet valve 12 is supplied with the main pressure prevailing in the hydraulic main pressure line 6, as a result of which the inlet valve 12 is switched to its actuated position or remains in said position.

The pilot valve 22 of the outlet valve 14 is arranged between a hydraulic high-pressure line 23 branching off from the hydraulic control pressure main line 17, a control pressure line 24 leading to the control port 15 of the outlet valve 14, and a hydraulic low-pressure line 25 leading into a collecting tank 3". In the state of rest of the pilot valve 22, the control pressure line 24 is shut off from the hydraulic high-pressure line 23 and connected to the hydraulic low-pressure line 25. In the actuated state of the pilot valve 22, the control pressure line 24 is connected to the hydraulic high-pressure line 23 and shut off from the hydraulic low-pressure line 25. Thus, the control port 15 of the outlet valve 14 is supplied with the low control pressure or ambient pressure in the unactuated state of the associated pilot valve 22, as a result of which the outlet valve 14 remains in the rest position thereof or is switched to said position. In the actuated state of the pilot valve 22, in contrast, the control port 15 of the outlet valve 14 is supplied with the main pressure prevailing in the hydraulic main pressure line 6, as a result of which the outlet valve 14 is switched to its actuated position or remains in said position The collecting tank 3' of the brake valve 8, said tank being shown separately in FIG. 1 and being close to the pump, is generally identical with the collecting tank 3 of the compressed air supply system 1 or is connected to said tank by a return line. The collecting tanks 3" of the outlet valve 14 and of the two pilot valves 18, 22, said tanks being shown separately for reasons of space in FIG. 1, are generally formed by a single collecting tank, which is connected to the collecting tank 3 of the compressed air supply system 1 by a return line.

In an ABS control system in which the two pilot valves 18, 22 are controlled by an electronic control unit 26 via electric control lines 27, 28, the brake pressure prevailing in the wheel brake line 10 and effective in the wheel brake cylinder 11 of the wheel brake is modulated in such a way by alternate opening and closing of the inlet valve 12 and of the outlet valve 14 that locking up of the relevant vehicle wheel is prevented and the wheeled vehicle remains brakable and steerable. Since the high control pressure is taken off via the hydraulic control pressure main line 17 at the hydraulic main pressure line 6, which is under a constant high pressure, the switching over of the ABS valves 12, 14 in the context of ABS control takes place with the same speed, irrespective of the target brake pressure input into the main pressure line 9 via the brake valve 8.

Figure 2:
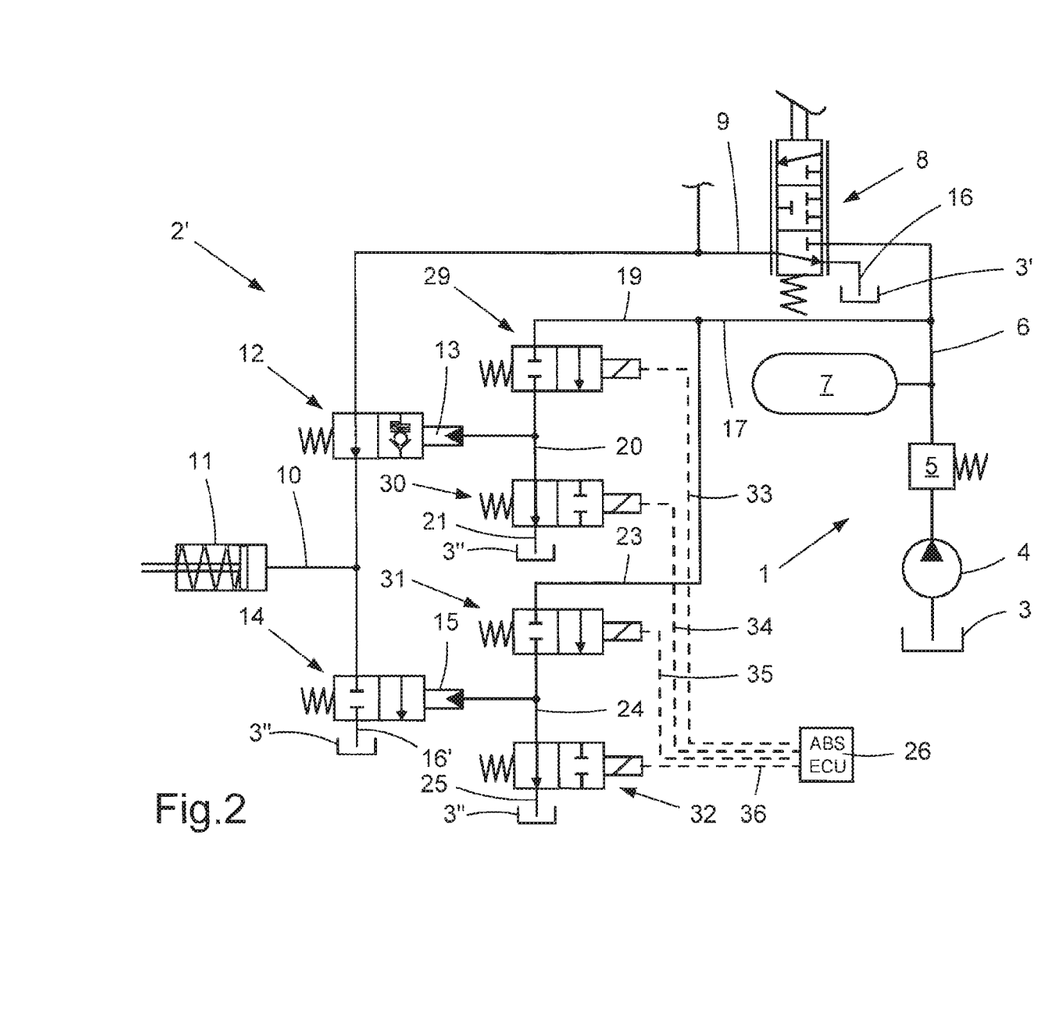
FIG. 2 shows a power-operated hydraulic brake system of a wheeled vehicle having a second valve arrangement according to an embodiment of the invention in an ABS control system in a schematic view.

In a power-operated hydraulic brake system of a wheeled vehicle, said system being depicted in schematic form in FIG. 2, the valve assembly 2' of the ABS control system differs from the valve assembly 2 shown in FIG. 1 in having a different embodiment of the pilot valves, while the inlet valve 12 and the outlet valve 14 are embodied in the same way. The inlet valve 12 and the outlet valve 14 are now each assigned two pilot valves 29, 30; 31, 32 designed as 2/2-way solenoid switching valves, by means of which the respective control port 13, 15 of the relevant inlet or outlet valve 12, 14 can be supplied alternately with a low or a high control pressure for the purpose of switching over.

The first pilot valve 29 of the inlet valve 12 is arranged between the hydraulic high-pressure line 19, which is connected to the hydraulic control pressure main line 17, and the control pressure line 20 leading to the control port 13 of the inlet valve 12. In the state of rest, i.e. in the deenergized state of the solenoid of the first pilot valve 29, the hydraulic high-pressure line 19 and the control pressure line 20 are shut off from one another and, in the actuated state, i.e. in the energized state of the solenoid of the first pilot valve 29, they are connected to one another. The second pilot valve 30 of the inlet valve 12 is arranged between the control pressure line 20 and a hydraulic low-pressure line 21 leading into a collecting tank 3". In the state of rest, i.e. in the deenergized state of the solenoid of the second pilot valve 30, the control pressure line 20 and the hydraulic low-pressure line 21 are connected to one another and, in the actuated state, i.e. in the energized state of the solenoid of the second pilot valve 30, they are shut off from one another.

The control port 13 of the inlet valve 12 is thus supplied with the low control pressure or ambient pressure in the unactuated state of the two associated pilot valves 29, 30. Accordingly, the inlet valve 12 is then in the rest position depicted, in which the wheel brake line 10 is connected to the main brake line 9. By an actuation, i.e. the switching over of the associated pilot valves 29, 30, the control pressure line 20 is separated from the hydraulic low-pressure line 21 and connected via the first pilot valve 29 to the hydraulic high-pressure line 19. As a result, the control port 13 of the inlet valve 12 is supplied with the main pressure prevailing in the hydraulic main pressure line 6, as a result of which the inlet valve 12 is switched to its actuated position, in which the wheel brake line 10 is shut off from the main brake line 9. The functionality of the two pilot valves 29, 30 of the inlet valve 12 thus corresponds to the functionality of the pilot valve 18 of the valve assembly 2 shown in FIG. 1.

The first pilot valve 31 of the outlet valve 14 is arranged between the high-pressure line 23, which is connected to the hydraulic control pressure main line 17, and the control pressure line 24 leading to the control port 15 of the outlet valve 14. In the state of rest of the first pilot valve 31, the high-pressure line 23 and the control pressure line 24 are shut off from one another and, in the actuated state of the first pilot valve 31, they are connected to one another. The second pilot valve 32 of the outlet valve 14 is arranged between the control pressure line 24 and a hydraulic low-pressure line 25 leading into a collecting tank 3". In the state of rest of the second pilot valve 32, the control pressure line 24 and the hydraulic low-pressure line 25 are connected to one another and, in the actuated state of the second pilot valve 32, they are shut off from one another.

The control port 15 of the outlet valve 14 is thus supplied with the low control pressure or ambient pressure in the unactuated state of the associated pilot valves 31, 32. Accordingly, the outlet valve 14 is then in the rest position depicted, in which the wheel brake line 10 is shut off from the return line 16'. By an actuation, i.e. the switching over of the associated pilot valves 31, 32, the control pressure line 24 is separated from the hydraulic low-pressure line 25 and connected via the first pilot valve 31 to the hydraulic high-pressure line 23. As a result, the control port 15 of the outlet valve 14 is supplied with the main pressure prevailing in the hydraulic main pressure line 6, as a result of which the outlet valve 14 is switched to its actuated position, in which the wheel brake line 10 is connected to the return line 16'. The functionality of the two pilot valves 31, 32 of the outlet valve 14 thus corresponds to the functionality of the pilot valve 22 of the valve assembly 2 shown in FIG. 1.

In an ABS control system in which the pilot valves 29, 30; 31, 32 are controlled by the electronic control unit 26 via electric control lines 33, 34; 35, 36, the brake pressure prevailing in the wheel brake line 10 and effective in the wheel brake cylinder 11 of the wheel brake is, as before, modulated by alternate opening and closing of the inlet valve 12 and of the outlet valve 14.

Figure 3:
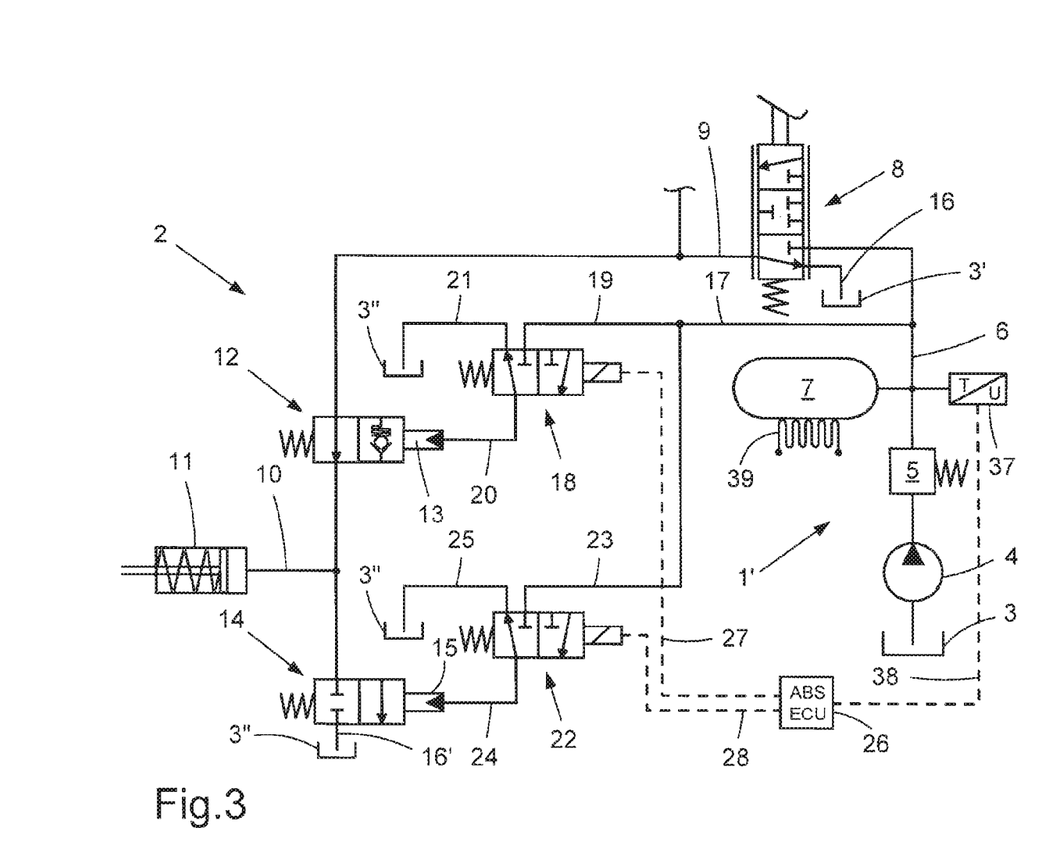
FIG. 3 shows a development of the hydraulic brake system shown in FIG. 1 in a schematic view.

A development of the power-operated hydraulic brake system of a wheeled vehicle shown in FIG. 1 is depicted in schematic form in FIG. 3, wherein the compressed air supply system 1' is additionally provided with the temperature sensor 37 and a heating element 39. By means of the temperature sensor 37, which is arranged on or in the storage reservoir 7 of the hydraulic pressure supply system 1', the oil temperature of the available hydraulic oil is detected and transmitted to the control unit 26 via a sensor line 38. It is thereby possible to adapt the control of the pilot valves 12, 14 to the current oil temperature and hence to the viscosity of the hydraulic oil. By means of the heating element 39 arranged on or in the storage reservoir 7, the available hydraulic oil can be heated and hence the viscosity thereof reduced. It is thereby possible, especially when using hydraulic oil with a particularly high viscosity, to quickly reduce the viscosity of the hydraulic oil in the cooled state and thus improve the control properties of the ABS valves 12, 14. At the same time, overheating of the hydraulic oil can be prevented through detection of the oil temperature by means of the temperature sensor 37.

Figure 4:
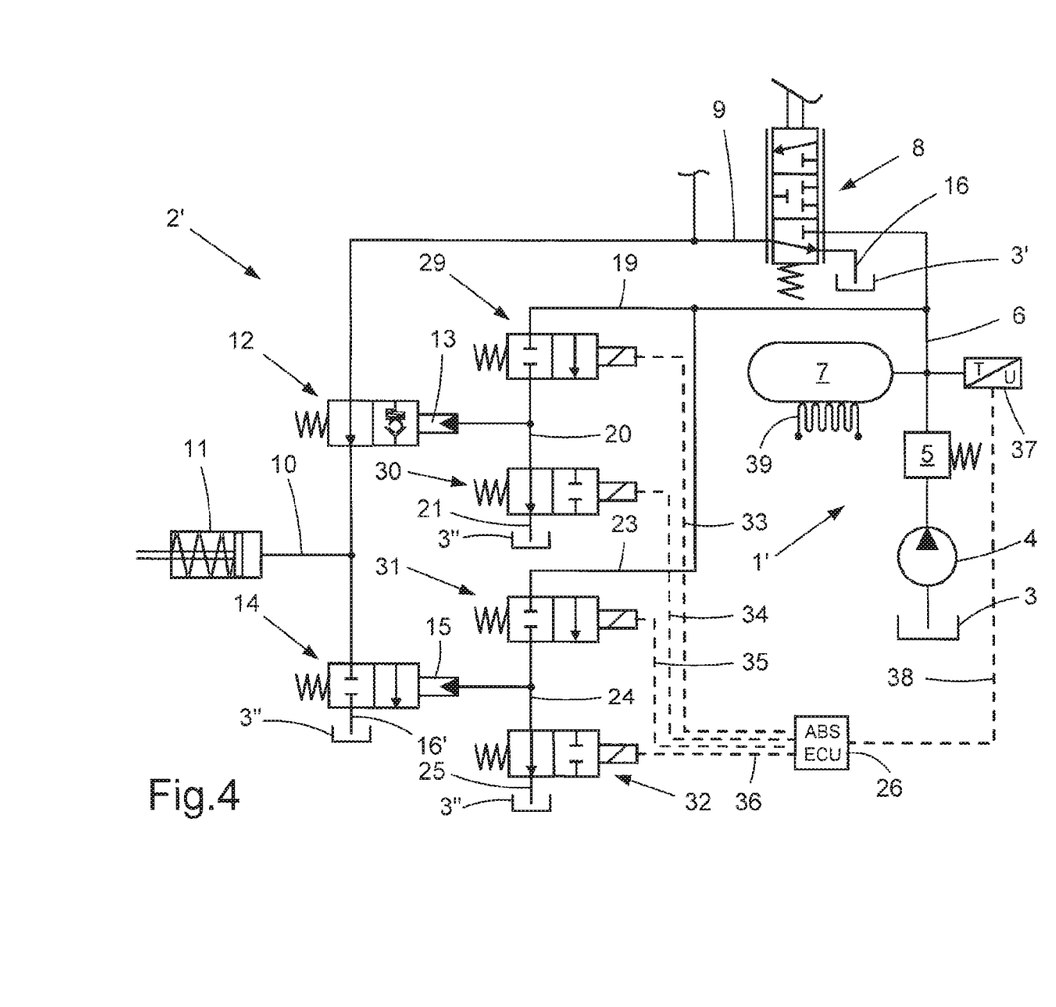
FIG. 4 shows a development of the hydraulic brake system shown in FIG. 2 in a schematic view.

A corresponding development of the power-operated hydraulic brake system of a wheeled vehicle shown in FIG. 2 is depicted in schematic form in FIG. 4, wherein the compressed air supply system 1' is provided in the same way with a temperature sensor 37 and a heating element 39.

Figure 5:
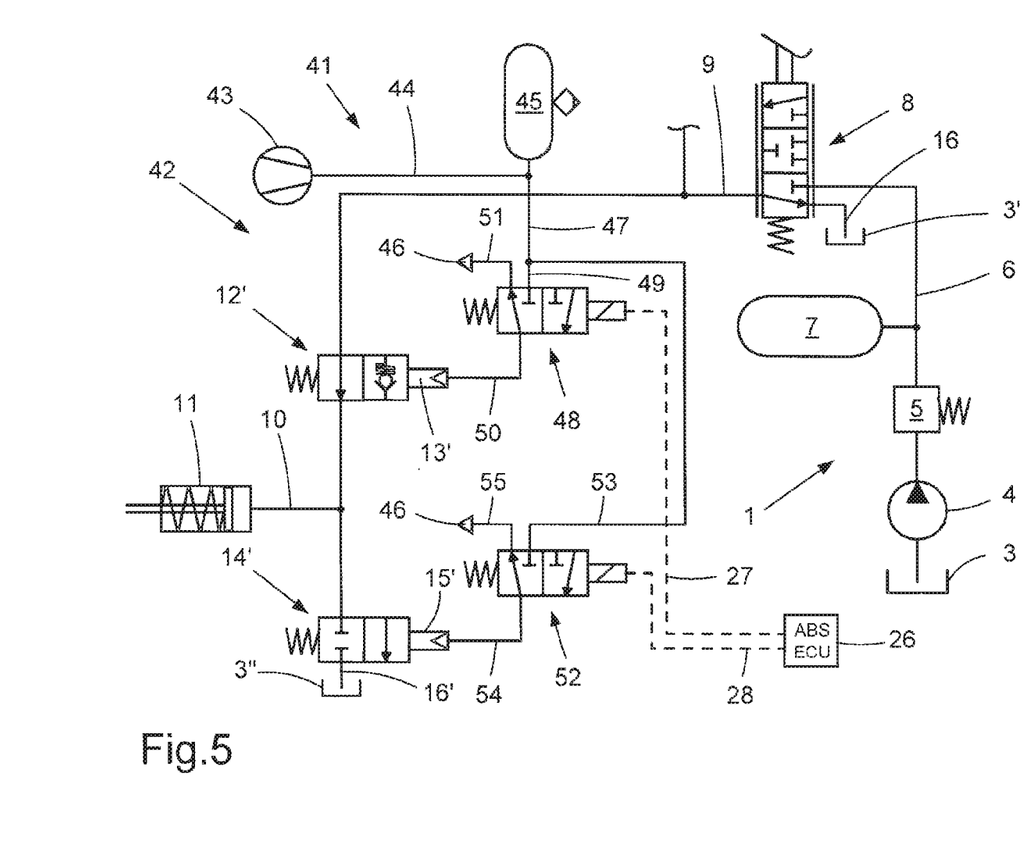
FIG. 5 shows a power-operated hydraulic brake system of a wheeled vehicle having a third valve arrangement according to an embodiment of the invention in an ABS control system in a schematic view.

While having a similar construction, a power-operated hydraulic brake system of a wheeled vehicle which is depicted in schematic form in FIG. 5 differs from the hydraulic brake system shown in FIG. 1 in having an additional pneumatic pressure supply system 41 and a modified valve assembly 42 of the ABS control system. In the pneumatic pressure supply system 41, compressed air can be delivered by means of a compressor 43 into a pneumatic main pressure line 44, to which a storage reservoir 45 is also connected.

With the same functionality in terms of braking, the inlet valve 12' and the outlet valve 14' are now designed as pneumatically pressure-controlled 2/2-way switching valves with correspondingly large switching cross sections, to each of which in the present case a pilot valve 48, 52 designed as a 3/2-way solenoid switching valve is assigned. Via the two pilot valves 48, 52, a respective control port 13', 15' of the relevant inlet or outlet valve 12', 14' can be alternately supplied with a low or a high control pressure for the purpose of switching over.

The pilot valve 48 of the inlet valve 12' is arranged between a pneumatic high-pressure line 49, which branches off from a pneumatic control pressure main line 47 connected to the pneumatic main pressure line 44, a control pressure line 50 leading to the control port 13' of the inlet valve 12', and a pneumatic low-pressure line 51 leading to a vent outlet 46. In the state of rest, i.e. in the deenergized state of the solenoid of the pilot valve 48, the control pressure line 50 is shut off from the pneumatic high-pressure line 49 and connected to a pneumatic low-pressure line 51. In the actuated state, i.e. in the energized state of the solenoid of the pilot valve 48, the control pressure line 50 is connected to the pneumatic high-pressure line 49 and shut off from the pneumatic low-pressure line 51. Thus, the control port 13' of the inlet valve 12' is supplied with the low control pressure or ambient pressure in the unactuated state of the associated pilot valve 48, as a result of which the inlet valve 12' remains in its depicted rest position or is switched to this position. In the actuated state of the pilot valve 48, in contrast, the control port 13' of the inlet valve 12' is supplied with the main pressure prevailing in the pneumatic main pressure line 44, as a result of which the inlet valve 12' is switched to its actuated position or remains in said position.

The pilot valve 52 of the outlet valve 14' is arranged between a pneumatic high-pressure line 53 branching off from the pneumatic control pressure main line 47, a control pressure line 54 leading to the control port 15' of the outlet valve 14', and a pneumatic low-pressure line 55 leading to a vent outlet 46. In the state of rest of the pilot valve 52, the control pressure line 54 is shut off from the high-pressure line 53 and connected to the pneumatic low-pressure line 55. In the actuated state of the pilot valve 52, the control pressure line 54 is connected to the high-pressure line 53 and shut off from the pneumatic low-pressure line 55. Thus, the control port 15' of the outlet valve 14' is supplied with the low control pressure or ambient pressure in the unactuated state of the associated pilot valve 52, as a result of which the outlet valve 14' remains in its rest position or is switched to this position. In the actuated state of the pilot valve 52, in contrast, the control port 15' of the outlet valve 14' is supplied with the main pressure prevailing in the pneumatic main pressure line 44, as a result of which the outlet valve 14' is switched to its actuated position or remains in said position.

The vent outlets 46 of the two pilot valves 48, 52, said outlets being shown separately in FIG. 5, can be embodied separately or can be combined in a common vent outlet. By virtue of the pneumatic control of the two ABS valves 12', 14', it is possible to use pilot valves 48, 52 of identical construction which are normally used in air braking systems.

The ABS control of the ABS valves 12', 14', in which the pilot valves 48, 52 are controlled by an electronic control unit 26 via electric control lines 27, 28, takes place in a manner similar to the ABS control of the ABS valves 12, 14 of the valve assembly 2 shown in FIG. 1. Here, the switching over of the ABS valves 12', 14' in the context of ABS control always takes place with the same speed, independently of the hydraulic pressure supply system 1 since the high control pressure is taken off via the control pressure main line 47 at the pneumatic main pressure line 44 of the pneumatic pressure supply system 41, which is under a constant high pressure.

Figure 6:
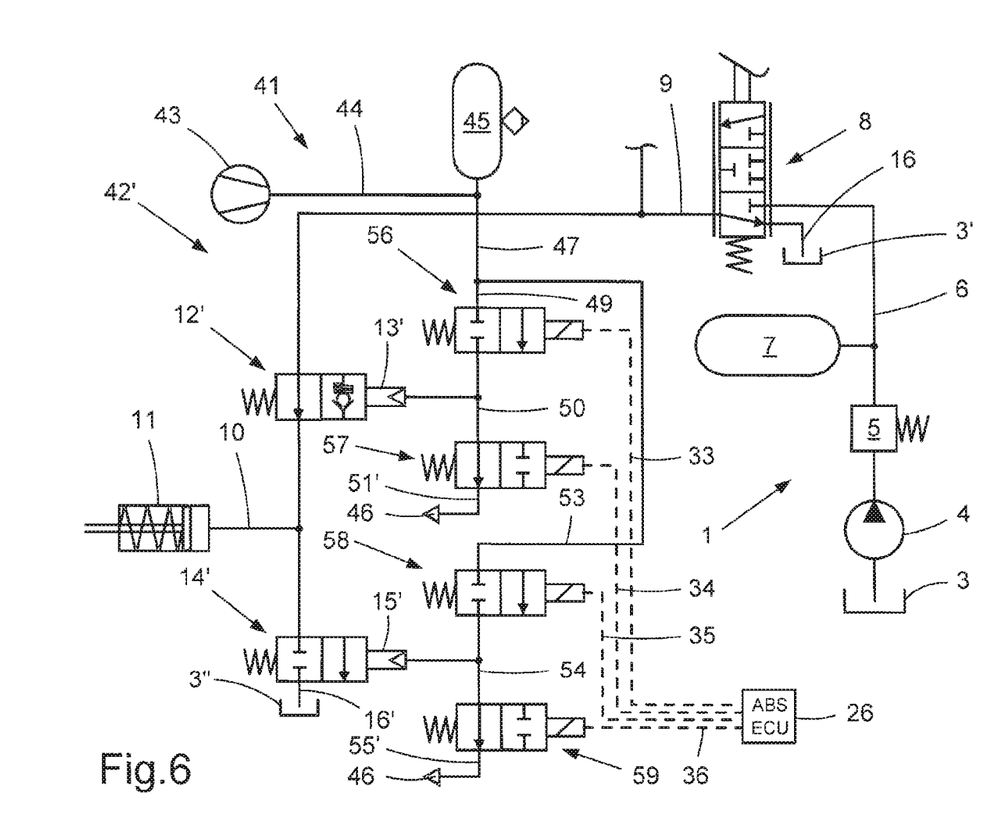
FIG. 6 shows a power-operated hydraulic brake system of a wheeled vehicle having a fourth valve arrangement according to an embodiment of the invention in an ABS control system in a schematic view.

While having a similar construction, the power-operated hydraulic brake system of a wheeled vehicle which is depicted in schematic form in FIG. 6 differs from the hydraulic brake system shown in FIG. 2 in having the additional pneumatic pressure supply system 41 and a modified valve assembly 42' of the ABS control system. As before, the inlet valve 12' and the outlet valve 14' are designed as pneumatically pressure-controlled 2/2-way switching valves but each of them is now assigned two pilot valves 56, 57; 58, 59 designed as 2/2-way solenoid switching valves.

The first pilot valve 56 of the inlet valve 12' is arranged between the pneumatic high-pressure line 49, which is connected to the control pressure main line 47, and the control pressure line 50 leading to the control port 13' of the inlet valve 12'. In the state of rest, i.e. in the deenergized state of the solenoid of the first pilot valve 56, the pneumatic high-pressure line 49 and the control pressure line 50 are shut off from one another and, in the actuated state, i.e. in the energized state of the solenoid of the first pilot valve 56, they are connected to one another. The second pilot valve 57 of the inlet valve 12' is arranged between the control pressure line 50 and a pneumatic low-pressure line 51' leading to a vent outlet 46. In the state of rest, i.e. in the deenergized state of the solenoid of the second pilot valve 57, the control pressure line 50 and the pneumatic low-pressure line 51' are connected to one another and, in the actuated state, i.e. in the energized state of the solenoid of the second pilot valve 57, they are shut off from one another.

The control port 13' of the inlet valve 12' is thus supplied with the low control pressure or ambient pressure in the unactuated state of the associated pilot valves 56, 57. Accordingly, the inlet valve 12' is then in the rest position depicted, in which the wheel brake line 10 is connected to the main brake line 9. By an actuation, i.e. the switching over of the associated pilot valves 56, 57, the control pressure line 50 is separated from the pneumatic low-pressure line 51' and connected via the first pilot valve 56 to the pneumatic high-pressure line 49. As a result, the control port 13' of the inlet valve 12' is supplied with the main pressure prevailing in the pneumatic main pressure line 44, as a result of which the inlet valve 12' is switched to its actuated position, in which the wheel brake line 10 is shut off from the main brake line 9. The functionality of the two pilot valves 56, 57 of the inlet valve 12' thus corresponds to the functionality of the pilot valve 48 of the valve assembly 42 shown in FIG. 5.

The first pilot valve 58 of the outlet valve 14' is arranged between the high-pressure line 53, which is connected to the control pressure main line 47, and the control pressure line 54 leading to the control port 15' of the outlet valve 14'. In the state of rest of the first pilot valve 58, the high-pressure line 53 and the control pressure line 54 are shut off from one another and, in the actuated state of the first pilot valve 58, they are connected to one another. The second pilot valve 59 of the outlet valve 14' is arranged between the control pressure line 54 and a pneumatic low-pressure line 55' leading to a vent outlet 46. In the state of rest of the second pilot valve 59, the control pressure line 54 and the pneumatic low-pressure line 55' are connected to one another and, in the actuated state of the second pilot valve 59, they are shut off from one another.

The control port 15' of the outlet valve 14' is thus supplied with the low control pressure or ambient pressure in the unactuated state of the associated pilot valves 58, 59. Accordingly, the outlet valve 14' is then in the rest position depicted, in which the wheel brake line 10 is shut off from the return line 16'. By an actuation, i.e. the switching over of the associated pilot valves 58, 59, the control pressure line 54 is separated from the pneumatic low-pressure line 55' and connected via the first pilot valve 58 to the high-pressure line 53. As a result, the control port 15' of the outlet valve 14' is supplied with the main pressure prevailing in the pneumatic main pressure line 44, as a result of which the outlet valve 14' is switched to its actuated position, in which the wheel brake line 10 is connected to the return line 16'. The functionality of the two pilot valves 58, 59 of the outlet valve 14' thus corresponds to the functionality of the pilot valve 52 of the valve assembly 42 shown in FIG. 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1, 1' hydraulic pressure supply system
2, 2' valve assembly
3, 3', 3" collecting tank, oil sump
4 oil pump
5 pressure limiting valve
6 hydraulic main pressure line
7 storage reservoir, pressure reservoir
8 brake valve
9 main brake line
10 wheel brake line
11 actuating unit, wheel brake cylinder
12, 12' inlet valve, ABS valve
13, 13' control port
14, 14' outlet valve, ABS valve
15, 15' control port
16, 16' return line
17 hydraulic control pressure main line
18 pilot valve, 3/2-way solenoid switching valve
19 hydraulic high-pressure line leading to the pilot valve 18, 29, 30
20 control pressure line
21 first hydraulic low-pressure line
22 pilot valve, 3/2-way solenoid switching valve
23 hydraulic high-pressure line leading to the pilot valve 22, 31, 32
24 control pressure line
25 second hydraulic low-pressure line
26 electronic control unit
27 electric control line
28 electric control line
29 first pilot valve, 2/2-way solenoid switching valve
30 second pilot valve, 2/2-way solenoid switching valve
31 first pilot valve, 2/2-way solenoid switching valve
32 second pilot valve, 2/2-way solenoid switching valve
33 electric control line
34 electric control line
35 electric control line
36 electric control line
37 temperature sensor
38 sensor line
39 heating element
41 pneumatic pressure supply system
42, 42' valve assembly
43 compressor
44 pneumatic main pressure line
45 storage reservoir, pressure reservoir
46 vent outlet
47 pneumatic control pressure main line
48 pilot valve, 3/2-way solenoid switching valve
49 pneumatic high-pressure line leading to the pilot valve 48, 56
50 control pressure line
51, 51' first pneumatic low-pressure line
52 pilot valve, 3/2-way solenoid switching valve
53 high-pressure line
54 control pressure line
55, 55' second pneumatic low-pressure line
56 first pilot valve, 2/2-way solenoid switching valve
57 second pilot valve, 2/2-way solenoid switching valve
58 first pilot valve, 2/2-way solenoid switching valve
59 second pilot valve, 2/2-way solenoid switching valve

The invention claimed is:

1. A power-operated hydraulic brake system for a wheeled vehicle, comprising:
a main brake line;
a high pressure hydraulic main line;
a brake valve disposed between and connected to the main brake line and the high pressure hydraulic main line, the brake valve being configured to input a target brake pressure into the main brake line;
one or more high pressure hydraulic control lines branching directly from the high pressure hydraulic main line;
a wheel brake line connected to an actuating unit of a wheel brake; and
a valve assembly of an ABS control system comprising:
an inlet valve arranged between the main brake line and the wheel brake line,
an outlet valve arranged between the wheel brake line and a low pressure return line,
a first valve set comprising one or more first pilot control valves, the first valve set configured to actuate the inlet valve by selectively connecting a control port of the inlet valve to a first hydraulic low pressure line or to the one or more high pressure hydraulic control lines, and
a second valve set comprising one or more second pilot control valves, the second valve set configured to actuate the outlet valve by selectively connecting a control port of the outlet valve to a second hydraulic low pressure line or to the one or more high pressure hydraulic control lines.

2. The brake system as claimed in claim 1, wherein the one or more first pilot control valves comprise a 3/2-way solenoid switching valve arranged between the one or more high pressure hydraulic control lines, a control pressure line leading to the control port of the inlet valve, and the first hydraulic low pressure line,
wherein the 3/2-way solenoid switching valve connects, in a deenergized state, the control port of the inlet valve to the first hydraulic low pressure line by connecting the control pressure line to the first hydraulic low pressure line, and
wherein the 3/2-way solenoid switching valve connects, in an energized state, the control port of the inlet valve to the one or more high pressure hydraulic control lines by connecting the control pressure line to the one or more high pressure hydraulic control lines.

3. The brake system as claimed in claim 1, wherein the one or more first pilot control valves comprise a first 2/2-way solenoid switching valve and a second 2/2-way solenoid switching valve,
wherein the first 2/2-way solenoid switching valve is arranged between the one or more high pressure hydraulic control lines and a control pressure line leading to the control port of the inlet valve,
wherein the first 2/2-way solenoid switching valve is configured to, in a deenergized state, shut off the one or more high pressure hydraulic control lines from the control pressure line, and is further configured to, in an energized state, connect the one or more high pressure hydraulic control lines and the control pressure line,
wherein the second 2/2 way solenoid switching valve is arranged between the control pressure line and the first hydraulic low pressure line, and wherein the second 2/2-way solenoid switching valve is configured to, in a deenergized state, connect the control pressure line and the first hydraulic low pressure line, and is further configured to, in an energized state, shut off the control pressure line from the first hydraulic low pressure line.

4. The brake system as claimed in claim 1, wherein the high pressure hydraulic main line is connected to a hydraulic pressure supply system, and
wherein the first hydraulic low pressure line and the second hydraulic low pressure line lead into an unpressurized collecting tank.

5. The brake system as claimed in claim 4, wherein a temperature sensor for detecting an oil temperature of available hydraulic oil is arranged in the hydraulic pressure supply system.

6. The brake system as claimed in claim 4, wherein a heating element for heating the available hydraulic oil is provided in the hydraulic pressure supply system.

7. The brake system as claimed in claim 5, wherein the temperature sensor and/or the heating element is/are arranged on or in a storage reservoir of the hydraulic pressure supply system.

8. The brake system as claimed in claim 1, wherein the one or more second pilot control valves comprise a 3/2-way solenoid switching valve arranged between the one or more high pressure hydraulic control lines, a control pressure line leading to the control port of the outlet valve, and the second hydraulic low pressure line,
wherein the 3/2-way solenoid switching valve connects, in a deenergized state, the control port of the outlet valve to the second hydraulic low pressure line by connecting the control pressure line to the second hydraulic low pressure line, and
wherein the 3/2-way solenoid switching valve connects, in an energized state, the control port of the outlet valve to the one or more high pressure hydraulic control lines by connecting the control pressure line to the one or more high pressure hydraulic control lines.

9. The brake system as claimed in claim 1, wherein the one or more second pilot control valves comprise a first 2/2-way solenoid switching valve and a second 2/2-way solenoid switching valve,
wherein the first 2/2-way solenoid switching valve is arranged between the one or more high pressure hydraulic control lines and a control pressure line leading to the control port of the outlet valve,
wherein the first 2/2-way solenoid switching valve is configured to, in a deenergized state, shut off the one or more high pressure hydraulic control lines from the control pressure line, and is further configured to, in an energized state, connect the one or more high pressure hydraulic control lines and the control pressure line,
wherein the second 2/2 way solenoid switching valve is arranged between the control pressure line and the second hydraulic low pressure line, and
wherein the second 2/2-way solenoid switching valve is configured to, in a deenergized state, connect the control pressure line and the second hydraulic low pressure line, and is further configured to, in an energized state, shut off the control pressure line from the second hydraulic low pressure line.

10. The brake system as claimed in claim 1, wherein the brake valve is configured to input the target brake pressure into the main brake line by providing a portion of a main pressure prevailing in the high pressure hydraulic main line.

11. The brake system as claimed in claim 10, wherein the brake valve is a 3/3-way proportional valve that is configured to be actuated by a brake pedal.

12. The brake system as claimed in claim 1, wherein the one or more high pressure hydraulic control lines branching directly from the high pressure hydraulic main line are configured to a provide, to the first valve set and to the second valve set, a main pressure prevailing in the high pressure hydraulic main line that differs from the target brake pressure input into the main brake line.

13. The brake system as claimed in claim 1, wherein the inlet valve and the outlet valve are of pneumatically controllable design, in that the pneumatic high-pressure lines of the associated pilot valves branch off from a pneumatic control pressure main line, which is connected to a pneumatic main pressure line of a pneumatic pressure supply system, and in that the pneumatic low-pressure lines of the associated pilot valves each lead to a vent outlet.

14. The brake system as claimed in claim 13, wherein the one or more high pressure pneumatic control lines branching directly from the high pressure pneumatic main line are configured to a provide, to the first valve set and to the second valve set, a main pneumatic pressure prevailing in the high pressure pneumatic main line that differs from the target brake pressure input into the main brake line.

15. The brake system as claimed in claim 13, wherein the high pressure hydraulic main line is connected to a hydraulic pressure supply system, and
wherein the high pressure pneumatic main line is connected to a pneumatic pressure supply system.

16. The brake system as claimed in claim 15, wherein the hydraulic pressure supply system includes a hydraulic oil pump configured to provide pressurized hydraulic oil, and
wherein the pneumatic pressure supply system includes an air compressor configured to provide compressed air.

* * * * *